July 17, 1956  C. P. GALANOT  2,755,146
TRACTION DEVICE

Filed Dec. 31, 1952  7 Sheets-Sheet 2

INVENTOR
Camille P. Galanot

July 17, 1956   C. P. GALANOT   2,755,146
TRACTION DEVICE
Filed Dec. 31, 1952   7 Sheets-Sheet 4

INVENTOR
Camille P. Galanot

July 17, 1956    C. P. GALANOT    2,755,146
TRACTION DEVICE

Filed Dec. 31, 1952    7 Sheets-Sheet 6

INVENTOR
Camille P. Galanot 2,755,146
Patented July 17, 1956

United States Patent Office 2,755,146

TRACTION DEVICE

Camille P. Galanot, Alliance, Ohio

Application December 31, 1952, Serial No. 328,923

15 Claims. (Cl. 305—10)

This invention relates to new traction devices of the endless kind. More particularly, it pertains to new traction devices which may readily be applied to rubber tired wheels on vehicles to improve the traction characteristics of such vehicles for other than normal travel on established roadways.

In the improved traction devices of my invention, a number of advantages are present which either were not present in prior devices or at least were not as effectively realized by the different structures of those prior devices. Such advantages inuring to my invention include, among others, true running between the vehicle wheels and my new traction devices, even at higher speeds. Further, improved gripping between such vehicle wheels and my new devices is provided. Still further, such new devices may very readily be applied to vehicle wheels, whether single or dual wheeled and whether on single or tandem axles, and, whenever an adjustment might be required as by the employment of a different tire pressure or size, for example, the new traction devices can readily be adjusted for whatever change in length of track may be desirable as a consequence of such a change in tire pressure or size. Again, my new devices are substantially rigid along the portion or reach thereof in contact with the ground or other surface against which they bear. At the same time, my invention provides for excellent articulation which is also resistant to forces tending to cause torsion or twisting of the treads, particularly where the treads are unsupported by being in actual contact with the tire or tires of the vehicle, although some "play" is preserved to minimize the development of excessive forces in operation. Such articulation, moreover, is achieved with minimum tire rubbing or wear and is protected in my new devices so as to remain readily operable despite the possible surrounding presence of gritty or aqueous foreign materials. In the new devices, provision is also made for freeing them of extraneous foreign materials that might otherwise cling thereto and at least tend to impair the traction improvement provided by the new devices which also furnish full support against the surface bearing the vehicle to which the new devices are applied. Additional advantages of this invention include relative interchangeability of the parts and the use of new unit subassemblies which can be longitudinally connected to provide new traction devices of any desired length and flexibility in accommodating different sizes of tires and wheel arrangements on the vehicles in question. In those new units of this invention, moreover, provision may readily be made for devices of different strengths where the employing vehicles differ in horsepower and traction force.

The foregoing and other objects and advantages will be apparent from the following description and from the drawings, which are illustrative only, in which—

Figure 4 is a schematic view of connector plates and treads of a new traction device of this invention applied to a vehicle wheel for normal forward rotation of that wheel in a direction opposite to the forward direction of the embodiment shown in Figure 1 and employing a new kickout element to insure outward snapping of the treads to help them free themselves from clinging material. Figure 4 also shows a new connecting tool with its mode of operation in putting together the ends of the new device shown to form an endless track;

Figure 1:
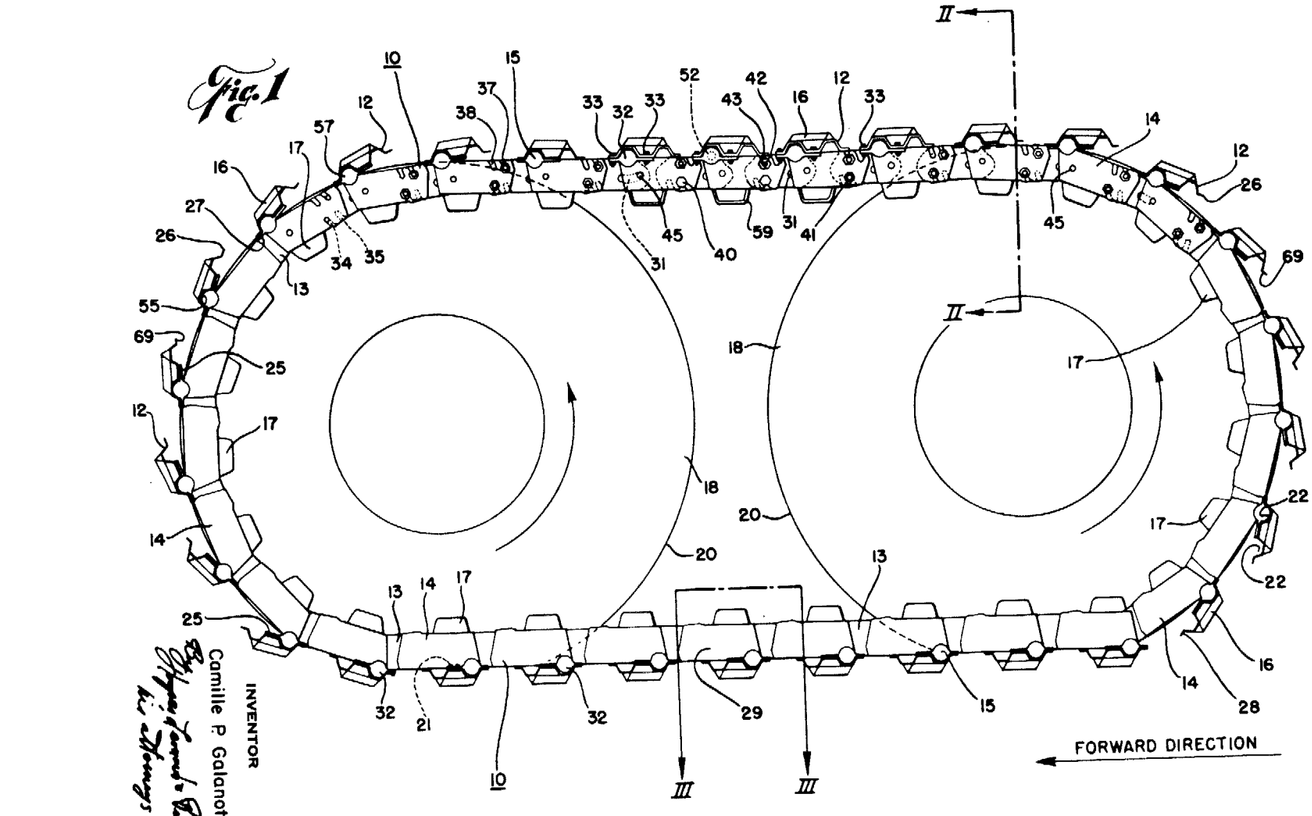
Figure 1 is a view in elevation of a new traction device of this invention applied to tandem single rubber tired wheels on a vehicle to improve the traction characteristics thereof.
Figures 2, 5:
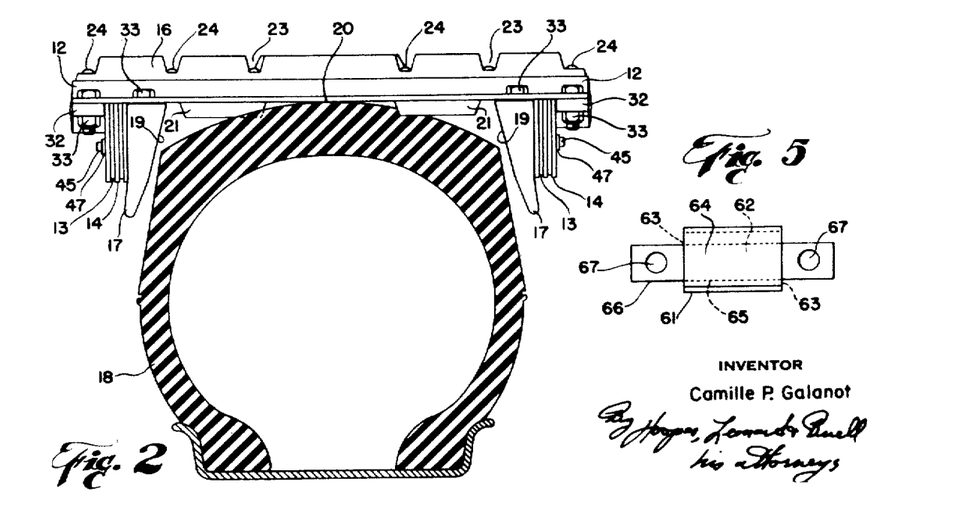
Figure 2 is a view in section taken along line II—II of Figure 1.
Figure 5 is a view taken in the direction of arrows V—V on Figure 4 to show more fully a form of kickout block which may be employed as a part of this invention.

Referring to Figure 1 of the drawings, a new traction device in the form of a track 10 may be provided for single wheels of a vehicle in tandem arrangement utilizing two axles. Thus, track 10 is an endless track made up of a series of traction units 11 connected together respectively at the forward and rearward ends thereof to adjoining units. Each unit 11 includes a track shoe or tread 12, which is horizontally and longitudinally corrugated, and at least a pair of connector plates 13 and 14 respectively in leading and trailing, horizontally interleaved, relation. In each unit 11 connector plates 13 and 14 are pivotally connected to tread 12 about the axis 15. If desired for use on surfaces where traction would be promoted thereby, a grouser 16 may be affixed to the bottom of each tread 12 by bolts, by welding or by riveting. In the embodiment of Figures 1 and 2, a single guide 17 on each side of the tandem tires 18 is provided and fastened to its adjoining connector plate, preferably plate 14. The faces 19 of the guides 17 which in each unit 11 are respectively of right and left hand recede as they extend toward the center of the track 10 in general conformance to the side of the tire which is adjacent thereto from time to time in the course of operation. When a track 10 is utilized around a single wheel not in tandem, then guides 17 are continuously adjacent the sides of the tire to which the new track is affixed. For improvement of gripping between wearing surface 20 of tire 18 and each traction unit 11, cleats 21 may be provided and fastened to the top of tread 12. Cleats 21 extend transversely and may be in staggered arrangement longitudinally to match the spacing of the laterally extending grooves in the wearing surface 20 of many kinds of tires to provide more positive gripping or interlocking between the tires and a new track 10 applied thereto.

Figure 3:
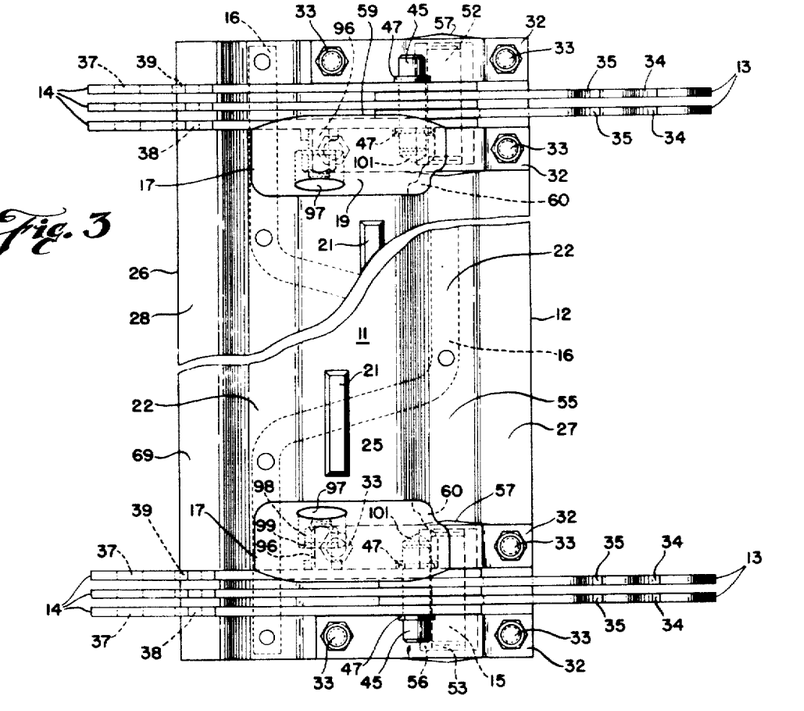
Figure 3 is a view of the embodiment shown in Figure 1 looking in the direction of arrows III—III thereon.

As shown in Figure 3, grouser 16 may be made in general "handlebar" shape with the center forward and the upper side of the grouser bearing against the exterior of valleys 22 in tread 12. If desired, the surface engaging portion of each grouser 16 may be transversely interrupted by the provision of notches 23 within which the heads of rivets 24, for example, may be seated in fastening the grouser 16 to the treads 12 to augment transverse gripping and to minimize wear of such heads 24. The cleats 21, on the other hand, are generally affixed to the top of the central plateau 25 of the treads 12 and, here also, any portion of a fastening rivet for the cleats extending through to the underside of the plateau will not be subject to as much wear as it would be if it were on the exterior of the valley bottoms in the tread. It may be noted that the grousers and cleats may be affixed to the treads in such places by bolts or by studs integral with the members in question for fitting into registering holes punched or drilled in the treads. In operative engagement, the grousers 16 face outwardly away from the tires and toward the ground or bearing surface to be encountered whereas the cleats 21 face inwardly toward the tires.

In operation, the embodiment of Figures 1 to 3 will run true as an endless track on the tires 18. The sole connection between tread 12, and any accompanying grouser 16 or cleat 21, with the balance of the respective traction unit 11 will be at the pivot 15. Hence, even though no kickout element may be provided, centrifugal force will "throw" the trailing ends 26 of the treads 12 outwardly (see Figure 1) as they round the respective tires 18. Thereby, extraneous foreign material tending to cling to the traction units or treads will be shaken off. At the same time, the maximum arc through which each tread 12 will throw is controlled and limited by, for example, the engagement between the leading plateau 27 of each tread 12 and the leading connector plates 13 in its respective traction unit 11. As a consequence, any vehicle employing the new traction devices can reverse and the traction treads 12 will operate to improve traction as they do in forward operation since in such reversing, the bearing surface or ground will first engage the trailing portion or portions 28 of the treads 12 and grouser 16 and force them against the outer edges of their respective connector plates in their respective traction units 11 as they pass through the lower reach 29 extending from the underside of one tire 18 to the underside of the other tire 18 in the embodiment shown. In that lower reach 29, the traction units 11 cooperate to provide a relatively straight-line structure, substantially rigid against upward deflection, in contact with the bearing surface not only beneath the wheels 18 but also in the portion of reach 29 between those wheels with vastly improved traction and minimization of any tendency to slip.

Figure 6:
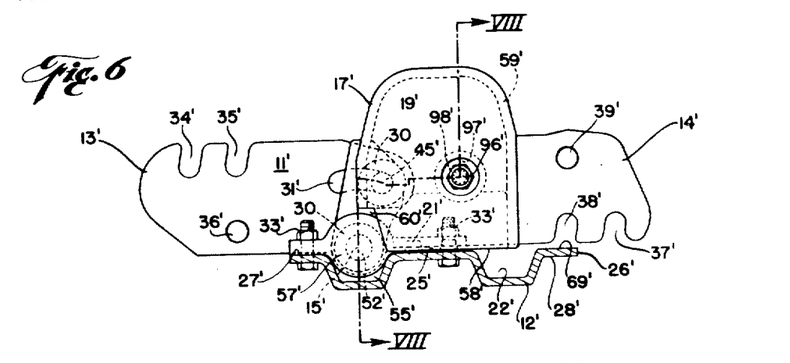
Figure 6 is a side view of a new traction unit utilizable in making up a new traction device for a dual tired wheel or wheels without any kickout, grouser or cleat elements being shown therein.
Figure 7:
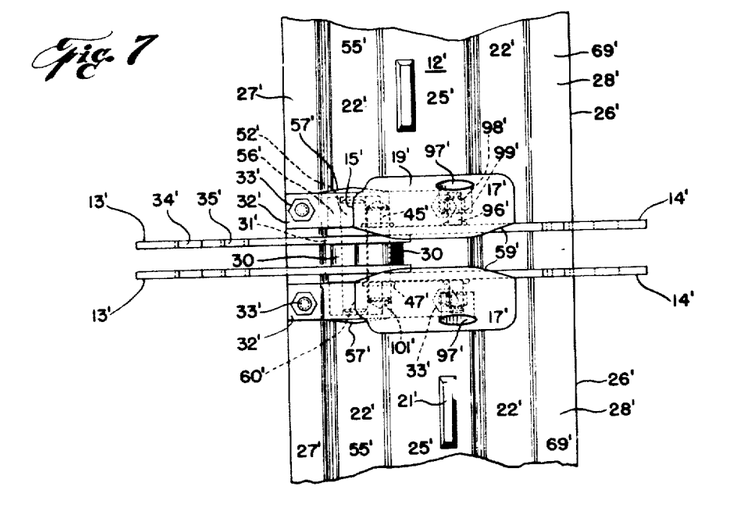
Figure 7 is a view of the unit shown in Figure 6 looking down at the top thereof.
Figure 8:
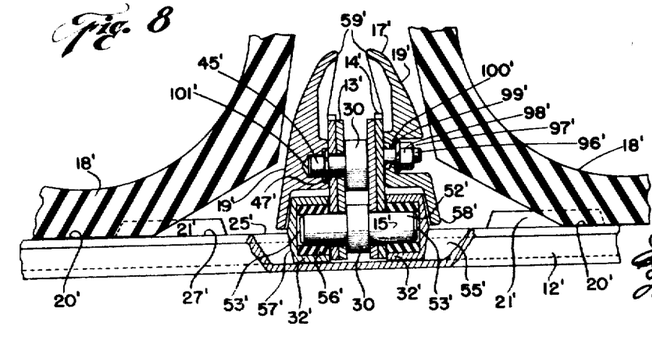
Figure 8 is a view of the unit as shown in Figure 6 taken along dot-and-dash line VIII—VIII of Figure 6.
Figure 10:
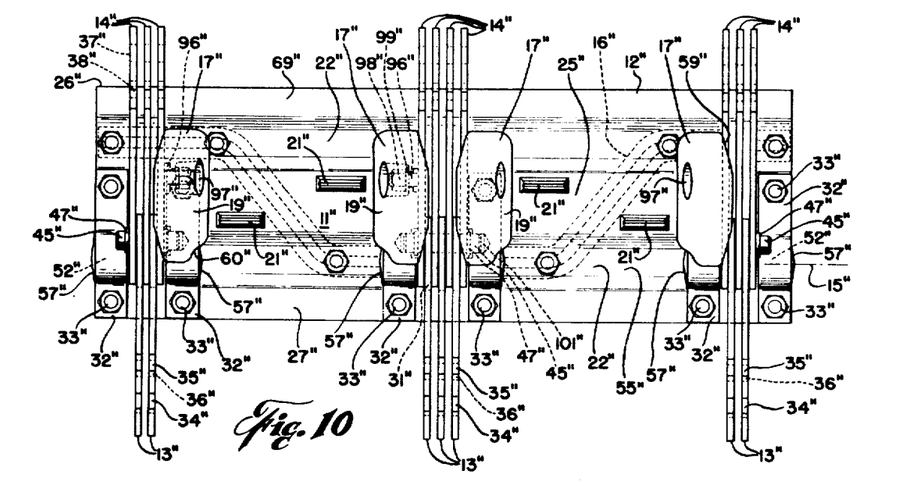
Figure 10 shows, from the top, an embodiment of a traction unit of this invention adapted for very heavy duty dual tired vehicles having single axle or tandem axle arrangements.
Figure 11:
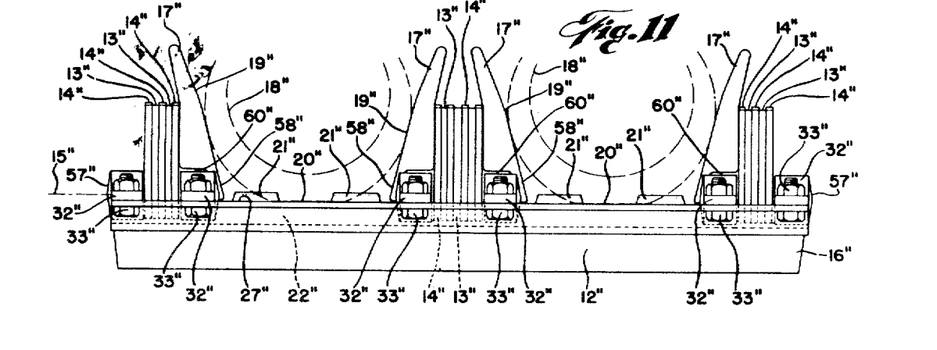
Figure 11 is a view in elevation of the new unit of Figure 10 looking at the leading edge thereof.
Figures 12, 13:
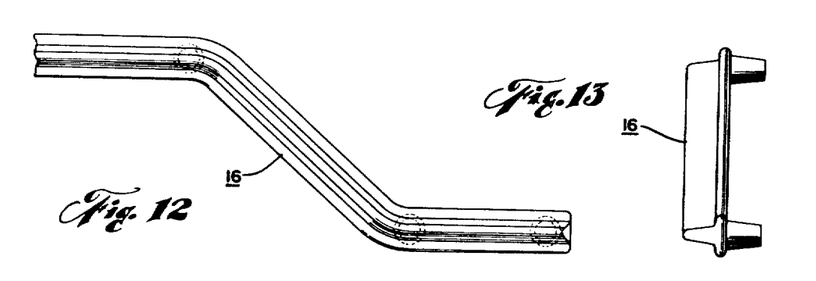
Figures 12 and 13 are respectively a bottom view and an end view of an all-metal grouser with a different configuration to its traction portion, for a new traction device of this invention.

The new structure and functioning of the traction unit 11 is essentially the same whether the traction unit is applied to single wheels as shown in Figures 2 and 3 or to dual wheels, whether or not in tandem, as shown in Figures 6 to 8, or to very heavy duty dual wheels as shown in Figures 10 and 11. Hence, to those structural parts of this invention corresponding generally in structure and function, the same reference numerals will be applied with no factor in the case of the embodiment of Figures 1 to 3, and with the addition of a prime (Figures 6 to 9 embodiment) or double prime (Figures 10 and 11 embodiment) factor, as the case may be.

Traction unit 11' of Figures 6 to 8 for a new track 10' will serve to illustrate various new features of this invention. Each unit 11' comprises a pair of leading connector plates 13' and a pair of trailing connector plates 14' in horizontally interleaved relation. Spacers 30 in the dual wheel embodiment of Figures 6 to 9, inclusive, may be used to separate the plates 13' and 14'. Plates 13' are provided with an arcuate slot 31' therein, although such slot may instead be provided in the trailing connector plates 14'. If spacers 30 are not used as in the case of a heavier duty track, the rocking plates 13' would normally be separated by a further interleaved trailing plate 14', or by two such trailing connector plates 14' separated by a further rocking plate 13' in the instance of a 3 x 4 connector plate assembly. Thus, as shown in Figures 10 and 11, the central portion of traction unit 11'' is a 3 x 4 connector plate subassembly having three rocking plates 13'' and four guide plates 14'' therein. It will be apparent that in this invention, new tracks of different strength capacities may readily be provided by increasing or decreasing the number of interleaved connector plates to match the forces that will be encountered. Space for such a variation in the number of connector plates may readily be provided by having pins of appropriate length and appropriately located drilled holes or sets of holes in the leading and central plateaus 27 and 25, for example, respectively through which a set of pivot housings 32' may be fastened as by bolt and nut assemblies 33'.

Figure 9:
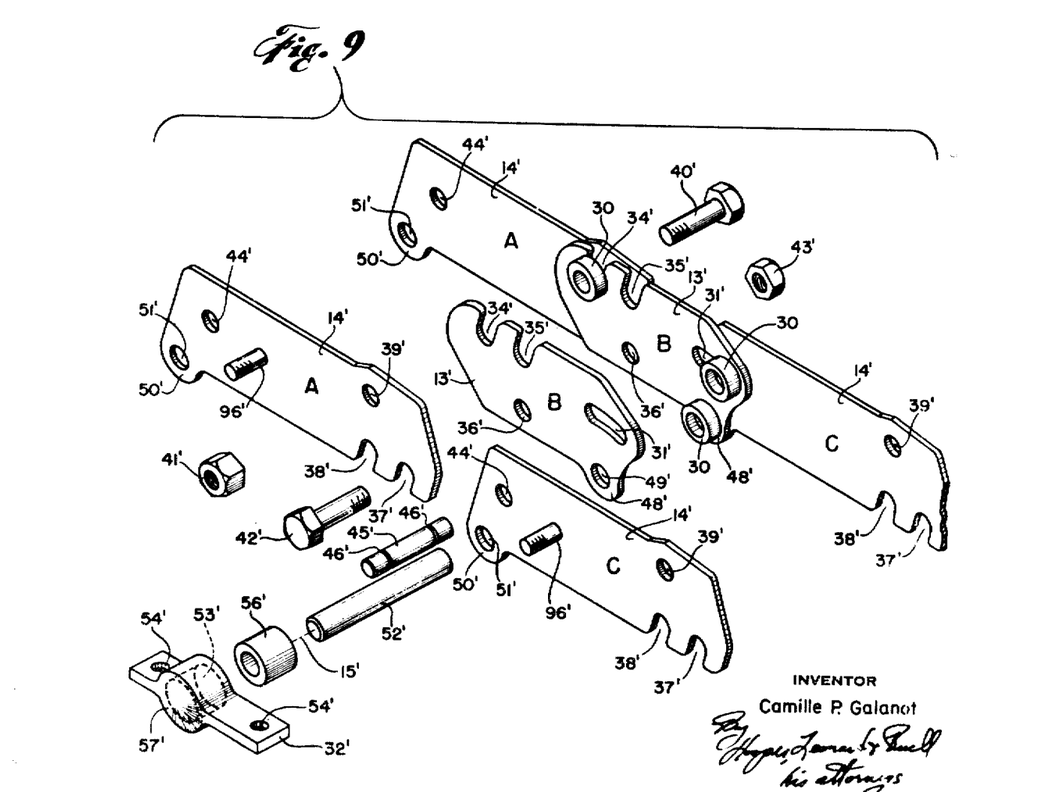
Figure 9 is an exploded view of a 2 x 2 connector plate and spacer unit shown in the unit of Figures 6 to 8 with a mode of connection therefor to an adjoining unit.

In the embodiment shown in Figures 6 to 10, each rocking plate 13' is provided with a forward notch 34' and a rearward notch 35' extending downwardly from the upper edges thereof, such notches in each of the rocking plates 13' in a traction unit 11' being in transverse registry. A drilled opening 36' is also present in each plate 13' in registry in each unit. Turning to Figure 9, the rocking plates 13' of one traction unit 11' are rigidly connected to the trailing guide plates 14' of the immediately forward traction unit 11'. The guide plates 14' are provided with an outer notch 37' and an inner notch 38' extending upwardly from the bottom edge thereof, such notches being in transverse registry for the plates 14' in a particular traction unit 11'. A drilled hole 39' is also provided toward the rear end of each such plate 14' to be brought into registry with one of said series of notches 34' or 35'. Hence, when a new track is assembled, adjoining traction units are connected by passing an upper bolt 40' through the registering openings 39' and through either the registering notches 34', or the registering notches 35'. A nut 41' with a lock washer completes the upper part of the connection between traction units. Similarly, a lower bolt 42' extends transversely through the registering openings 36' of the following traction unit in the plates 13' and through either the registering notches 37' or the registering notches 38' of the immediately forward guide plates 14'. A nut 43' and a lock washer completes the rigid connection between adjoining traction units 11'. The rigid connection between traction units 11' which has just been described is separable for longitudinal adjustment. Thus, if bolt 40' extends through the notches 34', the bolt 42' must extend through the notches 37' and the respective traction units 11' so connected are coupled as far apart as possible in the embodiment shown. On the other hand, if bolt 40' extends through the notches 35' then bolt 42' will extend through the notches 38' and the respective traction units 11' will be coupled more closely.

It is evident that additional coupling adjustment may be provided, if required, by the provision in the connector plates of still further notches of the kind described. In the dual wheel embodiment shown in Figure 9, the bolts 40' and 42' also extend through the centers of the spacers 30 separating the rocking plates 13' preferably at all places where a bolt or pin passes therebetween. In Figure 9, the guide plates 14' marked A belong to the immediately forward traction unit 11', while the rocking plates 13' marked B and the guide plates 14' marked C belong to the immediately succeeding traction unit 11'.

The rocking plates 13' and the guide plates 14' within each traction unit 11' are articulated for bending movement of the outer ends of the respective connector plates in each such unit generally inward about the axis 15' with the wheels in which a new guide toward the center of plate employing traction units 11' is mounted and generally outwardly toward a straight line position in their upper or lower reach position when applied to tandem wheels. The arcuate slots 31' are described about the axis 15' as a center. In turn, the forward end of the guide plates 14' are provided with transversely drilled holes 44' in registry. An articulation pin 45' passes through slots 31' and holes 44' to link the rocking plates B with the guide plates C. Pin 45' is provided with circumferential grooves 46' into which snap rings 47' snap to hold pin 45' in linking relation to the plates B and C.

The lower rear ends of the rocking plates 13' are provided with ears 48' through which transversely registering holes 49' are drilled. Similarly the forward lower ends of the guide plates 14' are provided with ears 50' through which transversely registering holes 51' are drilled. In assembling the traction device the holes 49' and 51' are in registry for the reception of a pivot pin 52' which extends through said openings. Hence, the plates B and C can pivot relative to each other about pin 52' to the extent of the limits of the slot 31'. The length of pin 52' is such that it extends beyond the outermost sides of the connector plates and into a socket 53' in each of the housings 32' on opposite sides of the plates 13' and 14' in each such traction unit. The bolt and nut assemblies 33' pass through drilled holes 54' which are so spaced as to span the forward valley 55' and rest on the top of the forward and central plateaus 27' and 25' respectively, which plateaus are appropriately drilled for the passage of the aforesaid bolt assemblies 33'. The open end of the sockets 53' is in juxtaposition to the outermost connector plates as shown in Figure 8 affording little space for the ingress of foreign material. Further, a rubber bushing 56' is provided around the outer ends of pins 52' and the axial length of each bushing 56' is slightly greater than the distance between the outer end 57' of socket 53' and the adjacent side of the nearest connector plate. Thereby, the bushings 56' are preferably slightly compressed axially and further protect and seal the bearing surface of pin 52' against admission of foreign materials which would tend to deteriorate that bearing surface. In that connection, the connector plates before being assembled are made flat and free from sharp edges and burrs which might tend to impair their interleaved pivoting or their action relative to pivot pin 52'.

Pivot pin 52' has a journaling relation relative to the connector plates 13' and 14' such that it in part maintains the connector plates generally vertical and normal to the axis 15. Hence, since adjoining traction units 11' are rigidly connected together, the laterally extending treads 12' cannot "flop around" as the new track turns. On the other hand, the provision of the resilient bushings 56' affords enough play throughout the new traction device of which the units 11' are a part, to cushion torsional and twisting forces that occur in operation without permitting such forces to throw the new traction device out of true running condition and effective operation. Such aspects of the new track described for application to dual tired vehicles constitute advantages also for the other embodiments of this invention like those illustrated in Figures 1 and 10. It may also be noted that the lower part of housing 32' containing socket 53' together with the ears 48' and 50' nests within valley 55' for most effective functioning. The new construction described is useful also in that by providing sets of spaced holes through a tread 12' for housings 32' and by providing a pivot pin 52' and an articulation pin 45' of appropriate length, the strength of a new traction device can be varied as desired by the use of a correspondingly greater or lesser number of interleaved connector plates associated with those pins and the remainder of the new structure. Similarly, the treads may be drilled in such a manner that more than one set of openings is provided in the event that the connector plates and guides have to be set in a different transverse location as in the case of guides on the outer ends of the treads such as shown in Figures 2 and 10, to accommodate different sizes of tires. Similarly, as by the use of spacers 30 or the addition, or by the subtraction of connector plates, the width of a traction unit guide and connector plate sub-assembly such as is shown in Figure 8, can be increased, or conversely decreased.

In the new traction device pictured in Figures 6 to 9, guide plates 14' are outboard relative to plates 13', and guides 17' are of right and left hand as shown. Each guide 17' has the receding face 19' previously described and generally conforming to the shape of the tire to be in juxtaposition therewith, in order to avoid any undue rubbing between face 19' and the side of the tires 18'. Indeed, any such tendency to rub is minimized by providing that the inboard connector plates, the rocking plates 13' function most in the swinging in connection with the actual articulation of a new track of this invention while passing around the periphery of a tire. In that way, since guide 17' is fixed, as will be described, relative to its guide plate 14', a minimum of rubbing and wear occurs between a face 19' and the tire surface adjoining it. Moreover, the tread 12' in each traction unit 11' is free to pivot and "throw" within the control limits illustrated without forcing a corresponding movement of guides 17' which might further rub the tires 18'. Face 19' is preferably smooth to minimize the friction of such contact as may occur and may be polished. Moreover, guide 17' may be made of a light metal like aluminum for efficient dissipation of any heat that may be generated and for optimum lightness in the new traction device so that in running, forces tending to cause vibration or off center running will be controlled. The bottom 58' of each guide 17' comprises a skirt which further serves to tend to keep foreign material away from the pivot axis 15' and articulation joint 45' within each traction unit 11. Similarly, an edge 59' around the sides and top of each guide 17' toward the adjacent connector plate similarly acts to shield the connector plate overlap and axis region. The lower forward end of each guide 17' is cut back to form a cut-out portion 60' which avoids interference in any pivoting of guide 17' and plate 14' relative to housing 32'.

The outboard connector plates 14' in the case of the embodiment shown in Figures 6 to 9 (which would be the inboard connector plate 14 in the embodiment shown in Figures 1 to 3) is provided with a stud 96' which may be a stud welded thereto by a Nelson stud welder. Thus each trailing connector plate next to a tire has such a stud and guide thereon. That stud, as shown in Figure 8, extends into a recess 97' so that a nut 98' and lock washer 99', if a self-locking nut is not used, may be used to hold guide 17' firmly in its traction unit 11', without such nut or the stud 96' or other portions of that fastening subassembly extending out beyond the plane of face 19' where it might engage and tear the tire 18'. An opening 100' is provided at the back of recess 97' so that stud 96' may extend therethrough and through guide 17'. At the forward end of guide 17' on the side thereof adjacent the connector plate 14' to which it is affixed, there is a blind bore 101' which relatively closely fits around the adjacent end of articulation pin 45' outwardly of the groove 46'. Thereby, each guide 17' is connected to its respective connector plate 14' at two points so as to comprise, in effect, a part thereof and to be immovable relative thereto. In the case of the embodiments shown in Figure 2 and as the assemblies on the outer ends of the treads 12" in Figures 10 and 11, there the respective guides 17 and 17" have their faces 19 and 19" turned inwardly toward the center of the treads and the extreme outer connector plates 14 and 14", adjacent the ends of treads 12 and 12", associated therewith have no studs corresponding to the studs 96' since such studs are preferably provided only when the connector plate is in juxtaposition to such a guide.

A kickout element may be used in cooperation with any new traction unit embodiment of this invention. For example, in the embodiment shown in Figures 6 to 9, no kickout element is provided nor is such an element provided in Figures 1 to 3. However, in Figures 4 and 5, there is illustrated a combinative kickout element which, for example, may readily be applied to any treads such as tread 12' and provide a positive throw of those treads when the treads are no longer held between the lower reach of the new track and the bearing surface supporting the vehicle in question. In general, such a kickout element may be used particularly with slower items of vehicular equipment like graders whereas higher speed vehicles are usually capable of generating enough centrifugal force to effect satisfactory throwing of the treads as described in connection with the embodiment of Figure 1, to prevent foreign material from clinging thereto.

Figure 4:
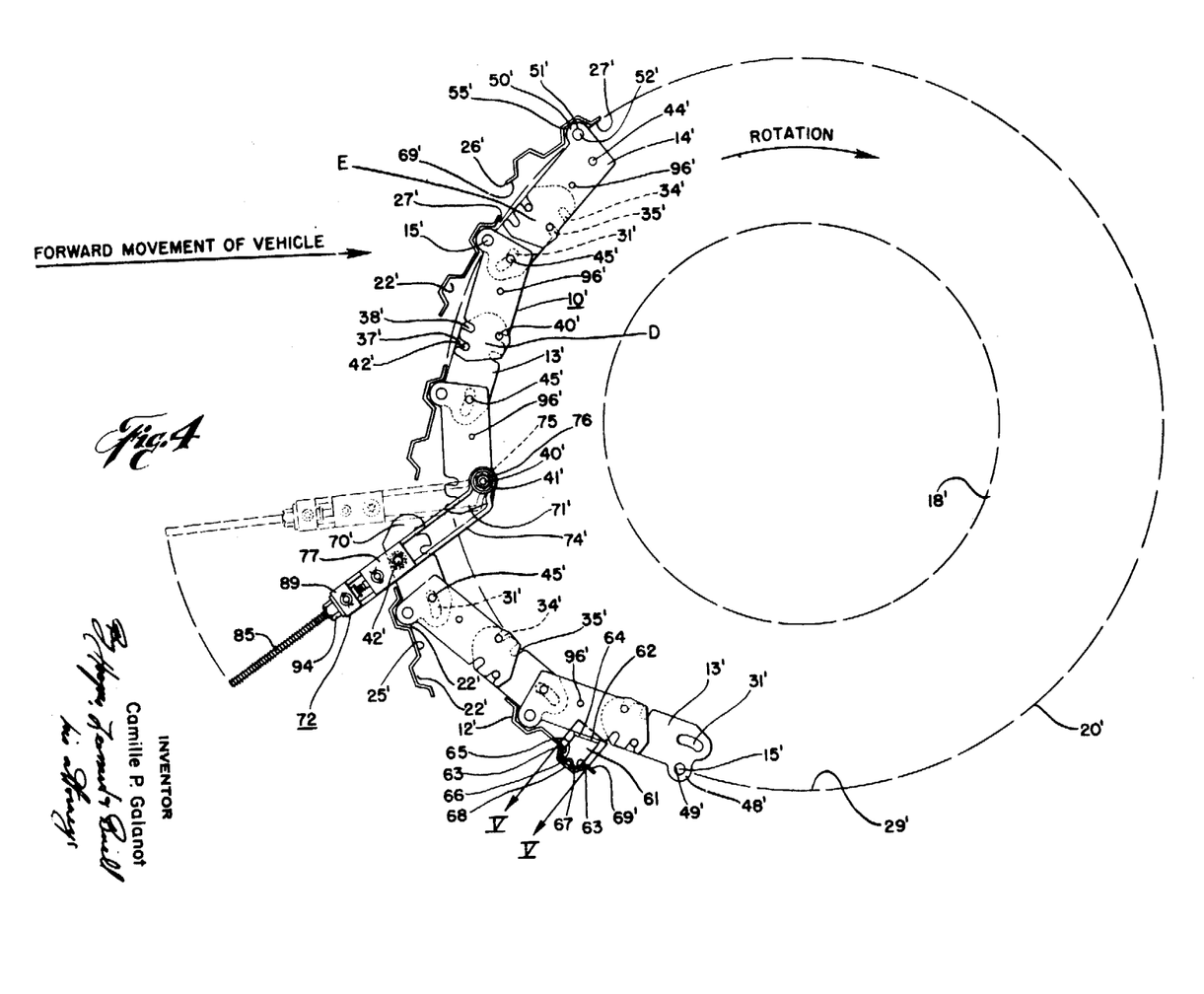

As shown in Figures 4 and 5, a kickout element may comprise a generally cubic block 61 of resilient material. The upper surface 62 of block 61 may be planar and inclined toward axis 15' assuming that such a block in the illustration is to be attached to a tread 12'. The lower forward and rear edges 63 of block 61 may be chamfered to fit into valley 22' of the tread. A metal bearing plate 64 may be affixed by a suitable adhesive so as to cover surface 62 and provide uniform compression of block 61 when tread 12' is swung into position parallel to the lower edge of the connector plates 14' when those treads 12' are in contact with the bearing surface supporting the vehicle in the course of being in their lower reach portion 29' in the endless track circuit. Even when the endless track is the length of a single tire periphery, more than one tread is in contact with the bearing surface supporting the vehicle in question. Bottom surface 65 of block 61 may be provided with an adherent metal strap 66 having drilled openings 67 at the ends thereof. As shown in Figure 4, countersunk flush head rivets 68 may be seated in corresponding countersunk holes in the bottom of valley 22' with the body of the rivet passing through the hole 67 to lock the block 61 to tread 12'. In the kickout element embodiment shown, no connection is provided between plate 64 and the bottom of the connector plates against which the top of plate 64 rests. It is clear that in operation, as shown in Figure 4, as each tread 12' leaves its lower reach position 29', block 61 will throw tread 12' outwardly about the pivot pin 52' to cast off any material like snow, ice, mud or other substance clinging thereto from the bearing surface. On the other hand, while in the lower reach portion 29', tread 12' will be against the lower edge of the guide plates 14' in that normally the central and rear plateaus 25' and 69' bear thereagainst for complete and well distributed rigid support.

Figure 4 also may be used to illustrate the manner in which a new traction device of this invention may be assembled around one or more tires. In general, each traction unit 11', assuming that the construction in Figure 4 is for dual tired wheels on a single axle, will be rigidly connected in the normal coupling relation illustrated at D, although two or more of the traction units 11' may be closer coupled as indicated at E in order to have the length of the new track 10' correspond relatively closely to the length of the peripheral wearing surface of the dual tires 18'. With such a preliminary adjusted length, track 10' can be laid flat on the ground and the dual tires 18' run up thereon until the ends 70' and 71' of track 10' can be drawn into the general relation shown in Figure 4 below the fender and usually on the wheel on the rearmost axle of the vehicle. It may be noted that a further advantage of the new traction devices is that tires do not have to be deflated to apply the new tracks thereto. Instead, the final coupling of the ends 70' and 71', and the same is true of the other embodiments of this invention, may readily be performed by virtue of the new construction.

Figure 19:
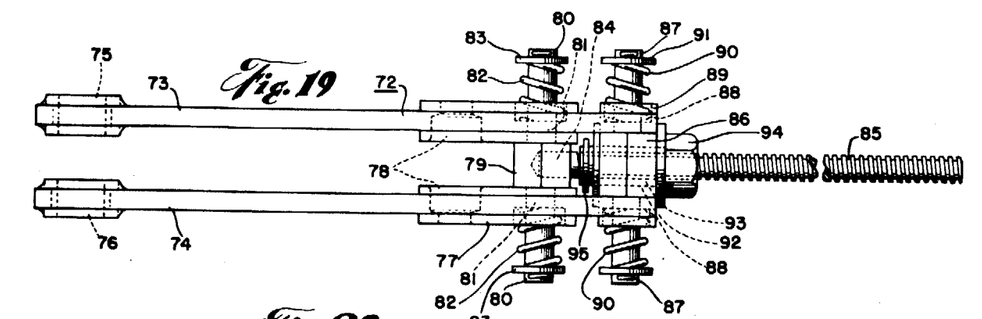
Figure 19 is a view looking down at my new connecting tool which may be utilized in connecting and adjusting my new traction devices.
Figure 20:
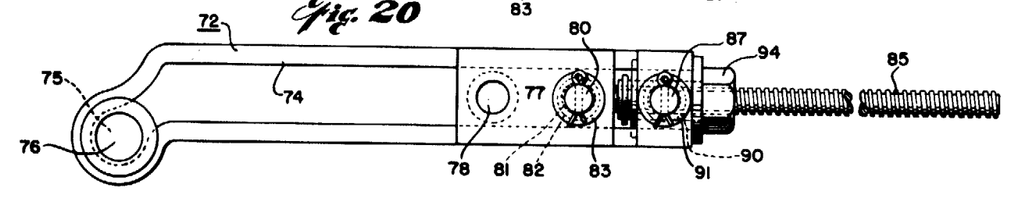
Figure 20 is a side view of the new tool shown in Figure 19.

A new connecting tool 72 useful in such coupling is illustrated in Figures 4, 19 and 20 and comprises two sets of spaced parallel ways 73 and 74 terminating in eyes 75 and 76. The internal diameter of the eyes is large enough to freely pass over the head of bolt 40' and nut 41'. Each set of ways 73 and 74 is provided with an H-section slide 77 thereon. Each slide 77 is provided with registering openings 78 which are large enough to pass freely over the head of bolt 42' and nut 43'. A trunnion block 79 having two transverse extensions 80 is assembled with the slide 77 in such manner that the body of block 79 is between and spaces the slides 77 while extensions 80 extend through openings 81 in the respective slides 77. Springs 82 abut against washers 83 fastened to the outer ends of extensions 80 and the other ends of said springs abut against a shoulder in the slide 77 to hold block 79 in assembled relation with such slides with which it moves but allows the ways and respective slides to be spread apart. Block 79 is bored at 84 so as to fixedly hold one end of a screw rod 85 which may be welded thereto. A retainer block 86 is provided which also has two laterally extending arms 87. Block 86 fits between the ways 73 and 74 and is resiliently fastened thereto to permit said ways and slides to be spread apart. The arms 87 pass through openings 88 in brackets 89 affixed to the ways 73 and 74. Springs 90 exert pressure against washers 91 and opposed shoulders in the brackets 89. Block 86 is longitudinally drilled at 92 so that screw rod 85 may pass therethrough and in order to journal a nut 93 in threaded engagement with the threads of rod 85. The portion of nut 93 passing through block 86 is rotatable relative thereto and to rod 85. A hexagonal head 94 integral with nut 93 at the one end and an annular flange 95 integral with nut 93 at the other end retain nut 93 in fixed axial position relative to the block 86. Hence when a ratchet or other wrench is applied to head 94 and head 94 is turned, the slides 77 are moved toward or away from the eyes 75 and 76 along the ways 73 and 74, as the case may be.

In operation, the final closure of the ends 70' and 71' of a new track 10' may readily be performed as well as any adjustment of that closure that may be desired subsequently. When tool 72 is spread and snapped over the heads of bolts 40' and 42' and their respective nuts as shown in Figure 4, subsequent movement of tool 72 from its solid line position to its dotted line position effects a levering action which makes it relatively simple, since the length of tool 72 will be appropriately chosen to exert sufficient leverage, to bring bolt 42' and bolt 40' into general radial alignment with the respective notches toward which they are to be moved. In the dotted position shown, tool 72 is ready to effect a normal coupling and final closure of the new track in accordance with the connection illustrated at position D. Further movement after the positioning described takes place is obtained by turning nut head 94 in a direction which will move the slides 77 toward the eyes 75 and 76 until the respective bolts are pressed into the notches with which they are to cooperate. On the other hand, if closer coupling as shown at position E is to be effected, additional leverage will be exerted to swing tool 72 upwardly beyond the dotted line position shown in Figure 4 until bolt 42' is in radial alignment with the notches 38' whereupon when slides 77 are moving toward the eyes, bolt 42' will move into the notches 38' and bolt 40' will move into the notches 35'. Adjustment to shorten or lengthen a track, already in endless form, as required can be performed by spreading the ways 73, 74 and slides 77 apart against the resistance of the springs 82 and 90 so that with slides 77 near the eyes 75 and 76, the heads of the bolts 40' and 42' and the respective nuts thereof can be engaged in the same manner as shown in Figure 4. Thereupon, if the adjusting nut head 94 is turned to separate slides 77 from the eyes 75 and 76, the two bolts will be pulled apart until free of their respective notches, whereupon the tool can then be used as a lever to bring the bolts into radial alignment with the other respective series of notches. When in adjusted radial alignment, the slides 77 are returned toward the eyes as in the case of final closure to complete the adjustment undertaken. Sufficient space exists between the respective trailing and leading edges of the immediately adjoining treads for the insertion of such a tool 72 and its operation, although by virtue of the new structure and the nature of that operation, relatively little gap is needed or exists between adjoining treads in the completed track.

A still further embodiment for very heavy vehicles is illustrated in Figures 10 and 11. Therein, the central connector plate and guide subassembly is similar in construction and in functioning to the embodiment more fully described above and illustrated in Figures 6 to 9. On the other hand, the guide and connector plate subassembly along the outer edges of the treads 12" are similar in general construction and functioning to the embodiment shown in Figures 1 to 3. As shown, the cleats used, such as cleats 21" may be laterally ribbed as shown in Figure 10 for more extensive contact with the surface of the tire in engagement therewith. The "handlebar" nature of a grouser 16" which may be utilized in conjunction with this embodiment, particularly under snow and ice conditions, is also shown in dotted outline of Figure 10 and such description is equally applicable to such described element. The kickout block cooperating element described in connection with Figure 4 is applicable to the embodiment of Figures 6 to 9 and is equally applicable to Figures 1 to 3 or to the embodiment of Figures 10 and 11. The treads of this invention with their respective transversely central plateaus and valleys not only provide effective traction in and of themselves even without grousers and/or cleats, but moreover, permit the fastening thereto of the housings 32, 32' and 32" in a manner which protects them and the associated parts and at least minimizes direct wear thereon, so that the new traction devices of this invention are comparatively long-lived.

The grouser variants shown in Figures 12 to 18 may also be utilized with the new traction devices of this invention. Thus in Figures 12 and 13, a continuous grouser, which may be made of steel, is provided having a portion extending below the tread surface which has a general cross-section like a T for more effective biting into icy or hardened surfaces. On many occasions, vehicles having traction devices thereon may have occasion to run on paved or at least established surfaced roadways and care must be taken to avoid material damage to those roadways. In those cases composite grousers such as those illustrated in Figures 14 to 18 may be employed. Thus, in the variant of Figures 14 and 15, an inverted generally U-shaped channel 102 may be provided and bolted by bolts 103 to a tread, with the bolts extending into the valleys of that tread within which valleys the nuts for such bolts 103, may be tightened. The sides at least of channel 102 may be formed in corrugated fashion as shown at 104 of spring steel and the entire channel may be covered with a molded rubber transverse rib 105 to complete the grouser. In fastening the composite grouser to a tread, the upwardly extending ends 106 will press against the bottom of the tread and act to keep moisture and mud from corroding the bolts and the top of channel 102. In service on a roadway having a prepared surface, the rubber or other resilient or plastic edge held in that shape by the flexible metal will protect that roadway against impairment. Yet in service off the roadway, the composite grouser of Figures 14 and 15 will act effectively as a grouser in improving traction.

Figures 14, 15:
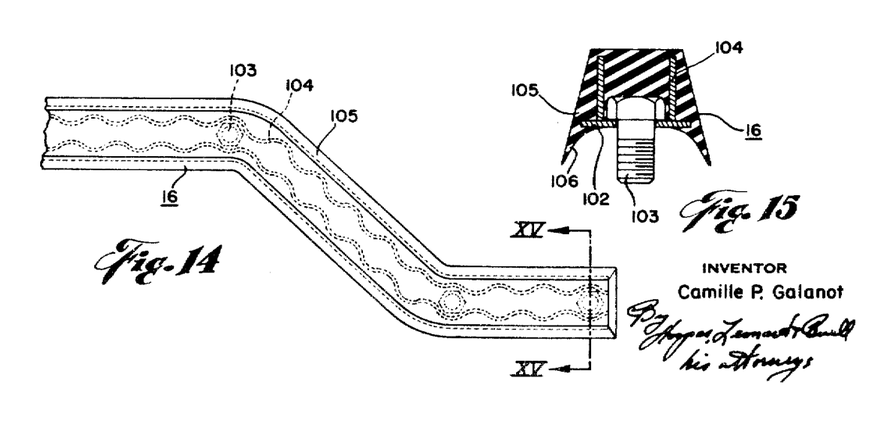
Figure 14 is a bottom view of a composite grouser which may be utilized when a vehicle employing the new traction devices of this invention has occasion, for example, to run on established surfaced roads.
Figure 15 is a section taken along line XV—XV of Figure 14.
Figure 16:
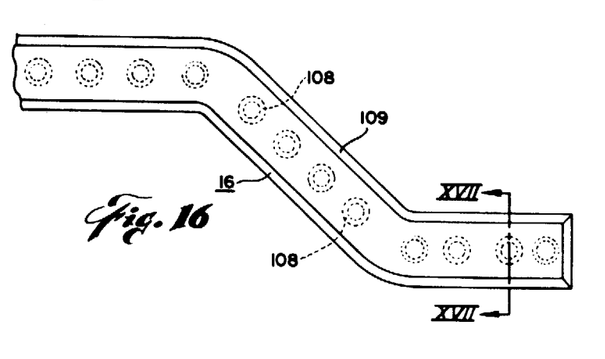
Figure 16 is a bottom view of another composite grouser embodiment.
Figure 17:
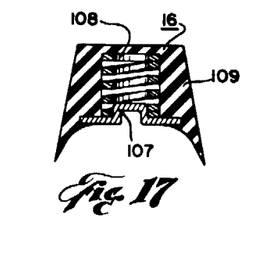
Figure 17 is a cross-sectional view taken along line XVII—XVII of Figure 16.
Figure 18:
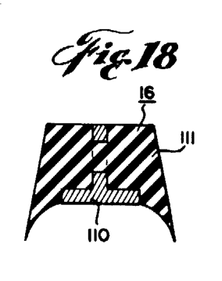
Figure 18 is a cross-sectional view of still another composite grouser embodiment which may be utilized in new traction devices of this invention.

The composite grouser variant of Figures 16 and 17 may be utilized in place of the grouser of Figures 14 and 15. It comprises a metal base or band 107 which is bolted or otherwise affixed to a tread and has spaced therealong coiled springs 108 which like the band 107 are imbedded in a resilient matrix 109 of a material like rubber. Another composite grouser is shown in Figure 18, in cross-section only, having a T-shaped rib 110, which may be of spring steel encased in a resilient or rubber matrix 111 for attachment and use as in the case of the other composite grousers described.

Various modifications may be made in my new traction devices and parts thereof without departing from the spirit of this invention or the scope of the following claims.

I claim:

1. A traction unit comprising, in combination, a laterally extending tread, a rocking plate pivotally connected to said tread and extending longitudinally in one direction, a guide plate pivotally connected about the same axis to said tread and extending longitudinally in the other direction, said plates overlapping in horizontally interleaved manner adjacent said axis, means engaging said plates to provide limited angular movement between said plates about said axis, and cooperating means between one of said plates and said tread to limit the angular movement of said tread about said axis relative to said plates.

2. A traction device comprising a plurality of longitudinally connected traction units having, in combination, a horizontally and longitudinally corrugated tread, at least a pair of vertically positioned connector plates pivotally connected to each other about a horizontal pivot, the leading portion of said tread further being connected to said pivot, one of said connector plates extending in one longitudinal direction being arcuately shaped about said pivot as a center, the other of said connector plates extending in the other longitudinal direction and being linked to said one of said connector plates across said arcuate portion of articulation relative thereto about said pivot, and a radially inwardly extending guide secured to the nearer of said connector plates, said guide having an upwardly receding face to engage the side of an adjacent tire with a minimum of rubbing.

3. A traction device comprising a plurality of longitudinally connected traction units having, in combination, a laterally extending tread, at least a pair of vertically positioned connector plates normal to the general plane of said tread, a horizontal transversely extending pivot pin fastened to said tread, said connector plates being pivotally connected to each other about said pivot pin, said connector plates further being connected to said tread solely about the axis of said pivot pin, an arcuate surface in at least one of said connector plates, said surface being circumscribed about the axis of said pivot pin, and an articulation pin extending across said surface and through an opening in the other of said plates, the length of said surface being such that upward pressure upon said pivot pin places said connector plates in generally rigid straight line relation whereas radially outward pressure relative to said pivot pin rotates said respective plates relative to one another to articulate said plates and traction unit in passing around the periphery of a tire.

4. A traction unit comprising, in combination, a laterally extending tread, a set of pivot housings fastened to said tread to receive the ends of said pivot pin, at least one rocking plate pivotally connected to said pin and extending forwardly, said rocking plate having an arcuate path therein circumscribed about the axis of said pin, at least a pair of guide plates pivotally connected to said rocking plate about said pin and extending rearwardly, an articulation pin extending through transverse registering openings in said guide plates and across said path said slot in said rocking plate to provide for limited angular movement between said plates about said axis, said plates overlapping in horizontally interleaved manner adjacent said pin with said guide plates being in outboard position relative to said rocking plate, and a generally arching guide fastened to the side of at least one of said guide plates adjacent a tire to which said traction unit is to be applied.

5. A traction unit comprising, in combination, a laterally extending tread, a set of pivot housings fastened to said tread, said housings having opposed sockets to receive the ends of said pivot pin, axially extending resilient bushings between said ends of said pivot pin and the walls of said sockets respectively, and connector plates pivotally connected to each other about said pin and extending forwardly and rearwardly, the axial length of said bushings being respectively such as to extend in a state of slight compression between the adjacent one of said plates and the outer end of said socket to protect the bearing surface of said pivot pin, said plates overlapping in horizontally interleaved manner adjacent said pin.

6. A traction unit comprising, in combination, a laterally extending tread, a rocking plate pivotally connected to said tread and extending forwardly, a guide plate pivotally connected about the same axis of said tread and extending rearwardly, said plates overlapping in horizontally interleaved manner adjacent said axis, means engaging said plates to provide limited angular movement of said plates about said axis, cooperating means between one of said plates and said tread to limit the angular movement of said tread about said axis relative to said plates, and resilient means positioned between said tread and at least one of said plates to turn said tread outwardly about said axis as it leaves engagement with a bearing surface for a vehicle to which said traction unit is applied.

7. A traction unit comprising, in combination, a laterally extending tread, a rocking plate pivotally connected to said tread about a horizontal transverse axis in the forward portion of said tread, said rocking plate extending forwardly, a guide plate pivotally connected about the same axis of said tread and extending rearwardly, said plates overlapping in horizontally interleaved manner adjacent said axis, means engaging said plates in a transverse manner to provide limited angular movement of said plates about said axis, cooperating means between one of said plates and said tread to limit the angular movement of said tread about said axis relative to said plates, and a resilient block fastened to the trailing portion of said tread and extending between said tread and said guide plate to throw said tread outwardly as it leaves engagement with a bearing surface for a vehicle to which said traction unit is applied.

8. A traction device comprising a plurality of longitudinally connected traction units having, in combination, a horizontally and longitudinally corrugated tread defining a plurality of transversely extending valleys and plateaus, overlapping interleaved connector plates pivoted to each other about a transverse horizontal pivot pin, said tread further being pivotally connected to said plates about a transverse horizontal axis, respective ones of said plates extending in forward and rearward directions for connection to adjoining traction units to complete an endless track, transversely extending cleats on the top of said treads, means for affixing said cleats to the top of at least one of said plateaus thereon, said cleats further being preferably longitudinally staggered and sized to fit into any lateral grooves of a tire to which said traction device is to be applied, means for articulating said forwardly and rearwardly extending plates relative to each other respectively radially inwardly about said pivot pin, and a guide fastened to one of said plates between it and said tire.

9. A traction device comprising a plurality of longitudinally connected traction units having, in combination, a horizontally and longitudinally corrugated tread defining a plurality of transversely extending valleys and plateaus, overlapping interleaved connector plates pivoted to each other about a transverse horizontal pivot pin, at least a portion of said pivot pin being nested within a forward one of said valleys in said tread, said tread further being pivotally connected to said plates about said transverse horizontal pivot pin, respective ones of said plates extending in forward and rearward directions for connection to adjoining traction units to complete an endless track, and means for linking said forwardly and rearwardly extending plates for limited angular movement relative to each other respectively radially inwardly only about said pivot pin, and a guide fastened to one of said plates between it and a tire to which said traction device is to be applied.

10. A traction device comprising a plurality of longitudinally connected traction units having, in combination, a laterally extending tread, overlapping interleaved connector plates pivotally connected to each other and to said tread about a common transversely horizontal axis, means adjacent said axis for linking said plates through the overlapping portion thereof for relative angular movement therebetween about said axis in a direction normal to the plane of said tread, a guide fastened to one of said plates and generally shielding said overlap from a tire to which said traction device is to be applied, said guide being positioned between said plate and said tire, and a composite grouser affixed to the bottom of said tread, said grouser having a radially outwardly projecting gripping portion of resilient material, said resilient material containing a flexible metal stiffening member for said portion.

11. A traction device comprising a plurality of longitudinally connected traction units having, in combination, a laterally extending tread, and overlapping connector plates pivoted to each other and to said tread about a transverse horizontal axis, a plurality of said plates extending respectively in forward and rearward directions for connection to adjoining traction units to complete an endless track, said plates extending forwardly being in overlapping secured relation to the rearwardly extending plates of the immediately forward traction unit, said first mentioned plates extending rearwardly being in overlapping relation to the forwardly extending plates of the immediately trailing traction unit, said connections between said traction units being rigid in all directions.

12. A traction device comprising a plurality of longitudinally connected traction units having, in combination, a laterally extending tread, overlapping interleaved connector plates pivoted to each other about a transverse horizontal axis, said tread being transversely and pivotally connected to said connector plates, respective ones of said plates extending in forward and rearward directions for connection to adjoining traction units to complete an endless track, said plates extending forwardly being in overlapping interleaved relation to the rearwardly extending plates of the immediately forward traction unit, said first mentioned plates extending rearwardly being in overlapping interleaved relation to the forwardly extending plates of the immediately trailing traction unit, the portions of the overlapping plates respectively on adjoining traction units having edge notches extending in opposite directions and in transverse registry with openings in the adjacent overlapping interleaved plate for rigid separable connection between said traction units.

13. A traction device comprising a plurality of longitudinally connected traction units having, in combination, a horizontally and longitudinally corrugated tread defining at least one transversely extending valley and plateau, overlapping generally flat vertically positioned connector plates pivoted to each other about a pivot extending at least partly along said valley, said tread being pivotally connected to said plates about the axis of said pivot, respective ones of said plates extending in forward and rearward directions for connection to adjoining connector plates in adjoining traction units to complete an endless track, and means for limited articulation of the forwardly and rearwardly extending plates relative to each other in said units.

14. An endless traction device for vehicle tires or the like, comprising, in combination, an endless band of generally flat overlapping connector plate units, said plates being vertically positioned, means for rigidly connecting said units to each other, each of said units having a pivot for articulation of the plates in said unit as it passes around a tire or the like, and a plurality of transversely extending treads pivotally connected to a plurality of units respectively on said endless band, said treads being outwardly of said band and the axis of said pivotal connection of said tread being generally horizontal and normal to the plane of said band.

15. An endless traction device for vehicle tires or the like, comprising, in combination, an endless band of generally flat overlapping connector plate units, said plates being vertically positioned, means for rigidly and adjustably connecting said units directly to each other, each of said units having a transverse horizontal pivot for articulation of the plates in said unit as it passes around a tire or the like, transverse means for preventing such articulation in a reverse bending direction, and a plurality of transversely extending treads pivotally connected to a plurality of units respectively on said endless band, said treads being outwardly of said band and the axis of said pivotal connection being coincident with the axis of said pivot.

References Cited in the file of this patent

UNITED STATES PATENTS

| | | |
|---|---|---|
| 1,357,154 | Diem | Oct. 26, 1920 |
| 1,602,419 | Staggers et al. | Oct. 12, 1926 |
| 1,825,693 | Henneuse | Oct. 6, 1931 |
| 1,953,388 | Bettin | Apr. 3, 1934 |
| 2,450,592 | Howison | Oct. 5, 1948 |
| 2,455,307 | Irvin | Nov. 30, 1948 |
| 2,516,115 | Hagenbuch et al. | July 25, 1950 |
| 2,561,678 | Tripp | July 24, 1951 |
| 2,599,592 | Stewart | June 10, 1952 |

---

UNITED STATES PATENT OFFICE

CERTIFICATE OF CORRECTION

Patent No. 2,755,146                            July 17, 1956

Camille P. Galanot

It is hereby certified that error appears in the printed specification of the above numbered patent requiring correction and that the said Letters Patent should read as corrected below.

Column 5, line 15, for "inward" read --inwardly--; column 6, line 21, for "sub-assembly" read --subassembly--; column 9, line 30, after "heavy" insert --duty--; column 10, line 52, for "of" read --for--; column 11, line 13, strike out --said slot--.

Signed and sealed this 9th day of October 1956.

(SEAL)
Attest:
KARL H. AXLINE
Attesting Officer

ROBERT C. WATSON
Commissioner of Patents forwardly extending plates of the immediately trailing traction unit, the portions of the overlapping plates respectively on adjoining traction units having edge notches extending in opposite directions and in transverse registry with openings in the adjacent overlapping interleaved plate for rigid separable connection between said traction units.

13. A traction device comprising a plurality of longitudinally connected traction units having, in combination, a horizontally and longitudinally corrugated tread defining at least one transversely extending valley and plateau, overlapping generally flat vertically positioned connector plates pivoted to each other about a pivot extending at least partly along said valley, said tread being pivotally connected to said plates about the axis of said pivot, respective ones of said plates extending in forward and rearward directions for connection to adjoining connector plates in adjoining traction units to complete an endless track, and means for limited articulation of the forwardly and rearwardly extending plates relative to each other in said units.

14. An endless traction device for vehicle tires or the like, comprising, in combination, an endless band of generally flat overlapping connector plate units, said plates being vertically positioned, means for rigidly connecting said units to each other, each of said units having a pivot for articulation of the plates in said unit as it passes around a tire or the like, and a plurality of transversely extending treads pivotally connected to a plurality of units respectively on said endless band, said treads being outwardly of said band and the axis of said pivotal connection of said tread being generally horizontal and normal to the plane of said band.

15. An endless traction device for vehicle tires or the like, comprising, in combination, an endless band of generally flat overlapping connector plate units, said plates being vertically positioned, means for rigidly and adjustably connecting said units directly to each other, each of said units having a transverse horizontal pivot for articulation of the plates in said unit as it passes around a tire or the like, transverse means for preventing such articulation in a reverse bending direction, and a plurality of transversely extending treads pivotally connected to a plurality of units respectively on said endless band, said treads being outwardly of said band and the axis of said pivotal connection being coincident with the axis of said pivot.

References Cited in the file of this patent

UNITED STATES PATENTS

| | | |
|---|---|---|
| 1,357,154 | Diem | Oct. 26, 1920 |
| 1,602,419 | Staggers et al. | Oct. 12, 1926 |
| 1,825,693 | Henneuse | Oct. 6, 1931 |
| 1,953,388 | Bettin | Apr. 3, 1934 |
| 2,450,592 | Howison | Oct. 5, 1948 |
| 2,455,307 | Irvin | Nov. 30, 1948 |
| 2,516,115 | Hagenbuch et al. | July 25, 1950 |
| 2,561,678 | Tripp | July 24, 1951 |
| 2,599,592 | Stewart | June 10, 1952 |

---

UNITED STATES PATENT OFFICE

CERTIFICATE OF CORRECTION

Patent No. 2,755,146                 July 17, 1956

Camille P. Galanot

It is hereby certified that error appears in the printed specification of the above numbered patent requiring correction and that the said Letters Patent should read as corrected below.

Column 5, line 15, for "inward" read --inwardly--; column 6, line 21, for "sub-assembly" read --subassembly--; column 9, line 30, after "heavy" insert --duty--; column 10, line 52, for "of" read --for--; column 11, line 13, strike out --said slot--.

Signed and sealed this 9th day of October 1956.

(SEAL)
Attest:
KARL H. AXLINE
Attesting Officer

ROBERT C. WATSON
Commissioner of Patents

UNITED STATES PATENT OFFICE
CERTIFICATE OF CORRECTION

Patent No. 2,755,146

July 17, 1956

Camille P. Galanot

It is hereby certified that error appears in the printed specification of the above numbered patent requiring correction and that the said Letters Patent should read as corrected below.

Column 5, line 15, for "inward" read --inwardly--; column 6, line 21, for "sub-assembly" read --subassembly--; column 9, line 30, after "heavy" insert --duty--; column 10, line 52, for "of" read --for--; column 11, line 13, strike out --said slot--.

Signed and sealed this 9th day of October 1956.

(SEAL)
Attest:
KARL H. AXLINE
Attesting Officer

ROBERT C. WATSON
Commissioner of Patents